United States Patent
Hsu (10) Patent No.: US 10,386,591 B2
(45) Date of Patent: Aug. 20, 2019

(54) ELECTRICAL CONNECTOR FOR USE WITH OPTOELECTRONIC MODULE

(71) Applicant: FOXCONN INTERCONNECT TECHNOLOGY LIMITED, Grand Cayman (KY)

(72) Inventor: Shuo-Hsiu Hsu, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/680,165

(22) Filed: Aug. 17, 2017

(65) Prior Publication Data

US 2018/0052292 A1 Feb. 22, 2018

(30) Foreign Application Priority Data

Aug. 17, 2016 (CN) .......................... 2016 1 0675084

(51) Int. Cl.
| | |
|---|---|
| G02B 6/42 | (2006.01) |
| H01R 13/639 | (2006.01) |
| H01R 12/70 | (2011.01) |
| H01R 12/71 | (2011.01) |

(52) U.S. Cl.
CPC .......... *G02B 6/4284* (2013.01); *G02B 6/428* (2013.01); *G02B 6/4278* (2013.01); *G02B 6/4292* (2013.01); *H01R 13/639* (2013.01); *G02B 6/4249* (2013.01); *H01R 12/7076* (2013.01); *H01R 12/716* (2013.01)

(58) Field of Classification Search
CPC .... G02B 6/4284; G02B 6/4278; G02B 6/428; G02B 6/4292; G02B 6/4249; H01R 13/639; H01R 12/7076; H01R 12/716

USPC ........................................................ 385/88
See application file for complete search history.

(56) References Cited

U.S. PATENT DOCUMENTS

| | | | |
|---|---|---|---|
| 5,011,426 A * | 4/1991 | Colleran ............ | B60G 17/0408 439/347 |
| 9,730,351 B2 | 8/2017 | Fit | |
| 2004/0081406 A1* | 4/2004 | Grob .................... | G02B 6/3849 385/76 |

(Continued)

FOREIGN PATENT DOCUMENTS

| | | |
|---|---|---|
| TW | M331235 | 4/2008 |
| TW | M375313 U1 | 3/2010 |
| TW | M491975 U | 12/2014 |

*Primary Examiner* — Jerry M Blevins
(74) *Attorney, Agent, or Firm* — Wei Te Chung; Ming Chieh Chang (57) ABSTRACT

An electrical connector assembly for connection between the optical device and the printed circuit board, includes a frame, a housing received in the frame, a retention lever pivotally mounted upon the frame for retaining the optoelectronic module, an optical jumper module located on a front portion of the housing and optically connected with the optoelectronic module wherein the retention lever includes a pressing section adapted to downwardly press the optoelectronic module, an handling section, and a downwardly protruding stopper formed on the handling section and adapted to abut against the printed circuit board when the retention lever is downwardly moved excessively. The frame is equipped with a locking hook to lock the retention lever in position so as to retain the optoelectronic module in position.

20 Claims, 10 Drawing Sheets

(56) References Cited

U.S. PATENT DOCUMENTS

| | | | | |
|---|---|---|---|---|
| 2006/0029336 A1* | 2/2006 | Gunther | ............... | G02B 6/4201 |
| | | | | 385/92 |
| 2013/0294732 A1* | 11/2013 | Li | ........................ | G02B 6/4219 |
| | | | | 385/83 |
| 2015/0349442 A1* | 12/2015 | Hsu | .................... | H01R 12/7076 |
| | | | | 439/68 |
| 2016/0006170 A1* | 1/2016 | Hsu | ........................ | H01R 13/62 |
| | | | | 439/345 |

* cited by examiner

ELECTRICAL CONNECTOR FOR USE WITH OPTOELECTRONIC MODULE

BACKGROUND OF THE DISCLOSURE

1. Field of the Disclosure

The invention is an electrical connector assembly, and particularly to the electrical connector assembly equipped with protection mechanism for the corresponding parts.

2. Description of Related Arts

U.S. Pat. No. 9,730,351 having the same inventor and the same applicant, discloses an electrical connector assembly using a retention lever to hold the optoelectronic module in position. Anyhow, the structures used in that design are relatively complex by providing the additional locking/ejecting lever interacting with the retention lever. In addition, the optical jumper element is associated with a holding device having a plurality of hooks thereon of which one is for combining the optical jumper element and the holding device together and other twos are for engagement with the corresponding downward shoulder structures at the front end of the housing for downwardly loading and upwardly unloading the optical jumper element with regard to the housing by inward deflection of the corresponding two hooks. U.S. Pat. No. 9,059,073 having the same inventor and the same applicant also discloses the similar/related structures. Anyhow, during operation the retention lever may be excessively downward deflected, thus damaging the module and/or the optical jumper element.

A simplified structure for is desired

SUMMARY OF THE DISCLOSURE

To achieve the above desire, an electrical connector assembly for connection between the optical device and the printed circuit board, includes a frame, a housing received in the frame, a retention lever pivotally mounted upon the frame for retaining the optoelectronic module, an optical jumper module located on a front portion of the housing and optically connected with the optoelectronic module wherein the retention lever includes a pressing section adapted to downwardly press the optoelectronic module, an handling section, and a protection stopper formed on the handling section and adapted to abut against the printed circuit board when the retention lever is downwardly moved excessively. The frame is equipped with a locking hook to lock the retention lever in position so as to retain the optoelectronic module in position.

DETAILED DESCRIPTION OF THE PREFERRED EMBODIMENT

Referring to FIGS. 1-10, an electrical connector assembly for connection between an optical device and a printed circuit board 100, includes a frame 1, a housing 2 received within the frame 1, a retention lever 3 pivotally mounted upon the frame 2 and an optoelectronic module 4 received within the housing and retained by the retention lever 3. An optical jumper module 200 is located in a front portion of the housing 2 and optically coupled to the optoelectronic module 4. The retention lever 3 includes a rear pivotal section 31 mounted to the frame 2, a middle pressing section 32 for pressing downward the optoelectronic module 4, a front handling section 33 for operating the retention lever 3, and an abutment block 34 formed on the handling section 33.

The abutment block 34 includes a pressing region 341 and a protrusion 342 downwardly projecting toward the printed circuit board 100 and functioning as a protection stopper. The abutment block 34 is located higher than the optical jumper module 200 in the vertical direction and is rearwardly spaced from the optical jumper module 200 in the front-to-back direction. Therefore, downward deflection of the abutment block 34 will not improperly touch or even damage the corresponding optical jumper module 200. Notably, the fibers (not labeled) of the optical jumper module 200 can be received in a space 343 under the abutment block 34 without damage. The pressing region 341 is formed with ribs 344 to stabilize the fingers thereupon during operation. The handling sections 33 are located in front of the housing 2 and spaced from each other in the transverse direction with a distance therebetween. Understandably, the separation of the handling sections 33 with the associated abutment blocks 34 in the transverse direction is to allow each pressing section 32 to be outwardly/laterally deflectable for loading/uploading the optoelectronic module 4 with regard to the housing 2.

During using, the pressing section 32 is downwardly pressed by the corresponding hook 11 of the frame 1 and simultaneously downwardly presses the ear 41 of the optoelectronic module 4 so as to retain the optoelectronic module 4 in the housing 2 in position.

The pivotal section 31 includes a fixing part 311 extending along the pivotal axis, and a resisting part 312 offset from the fixing part 311 with a parallel distance. The frame 1 includes a pair of restriction section 12 so as to have the fixing part 311 is pivotally mounted thereto. Notably, when the retention lever 3 is moved to the outermost open position, the resisting part 312 abuts against the printed circuit board 100.

Figure 1:
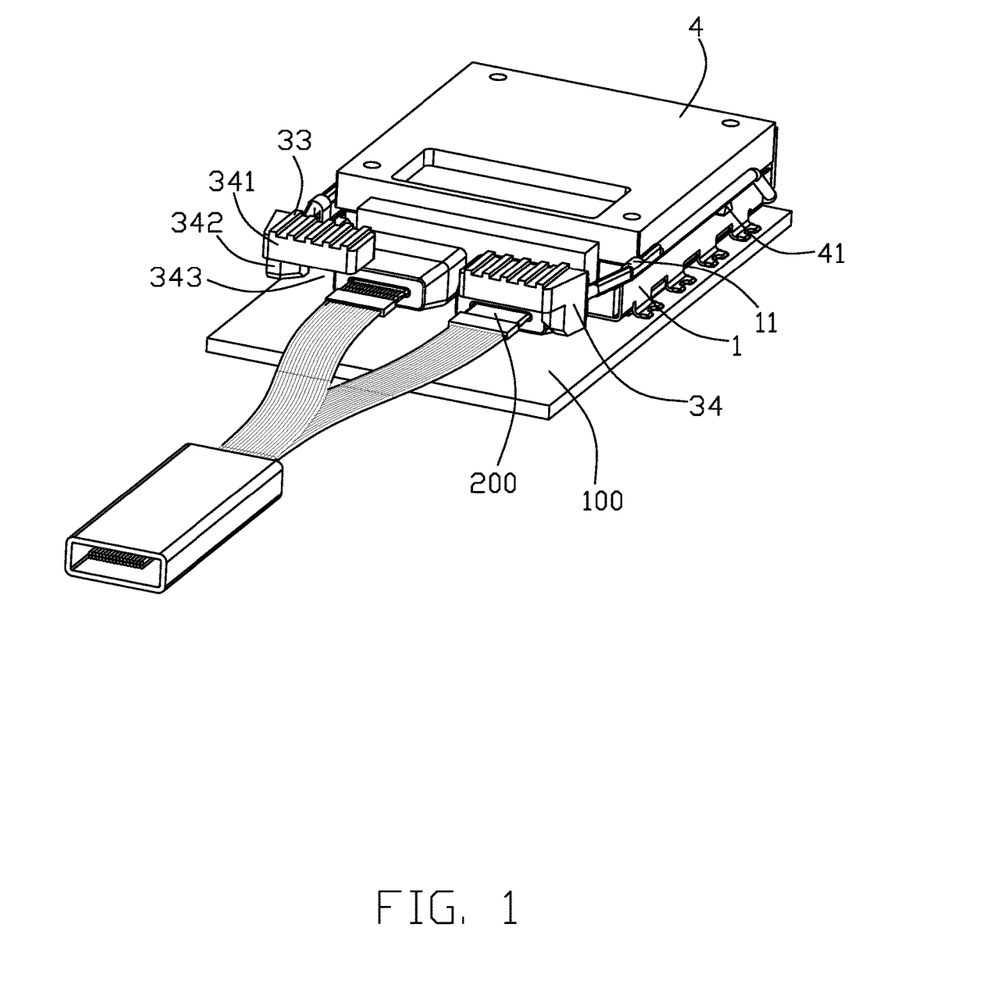
FIG. 1 is a perspective view of an electrical connector assembly of the invention according to the presently preferred embodiment.
Figure 2:
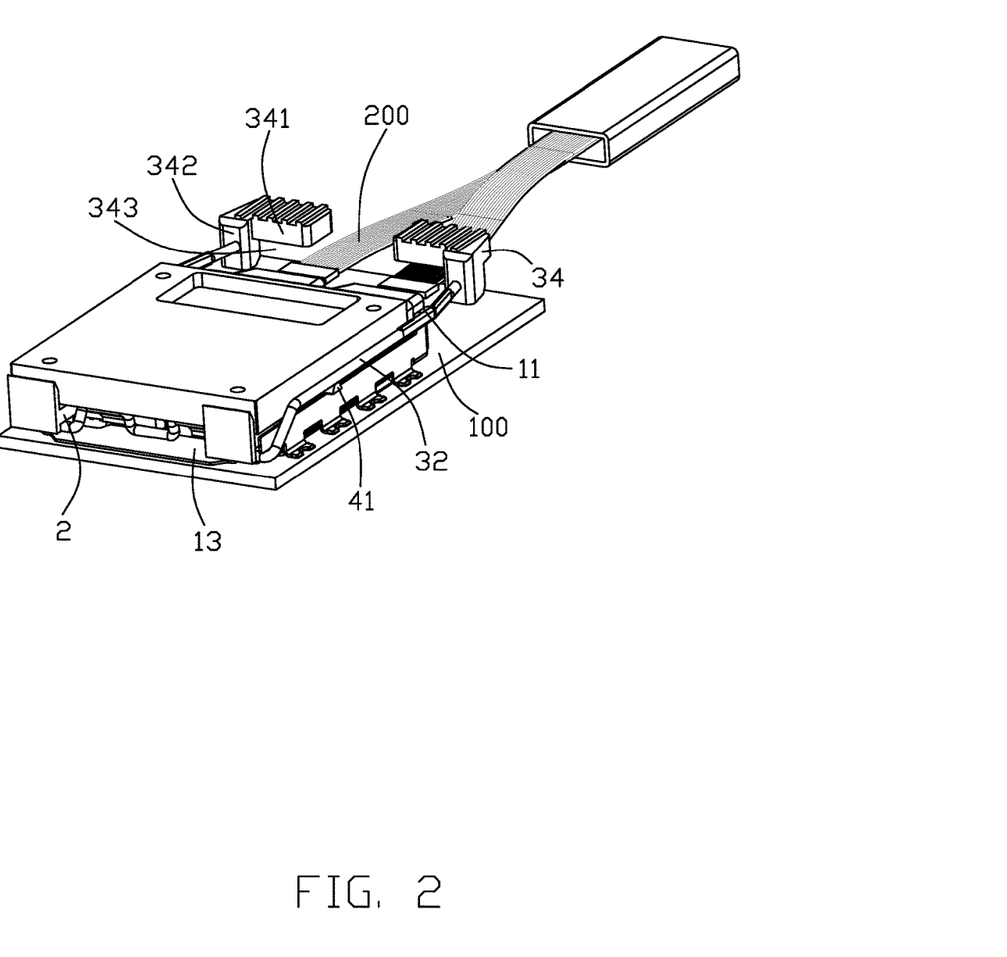
FIG. 2 is another perspective view of the electrical connector assembly of FIG. 1.
Figure 3:
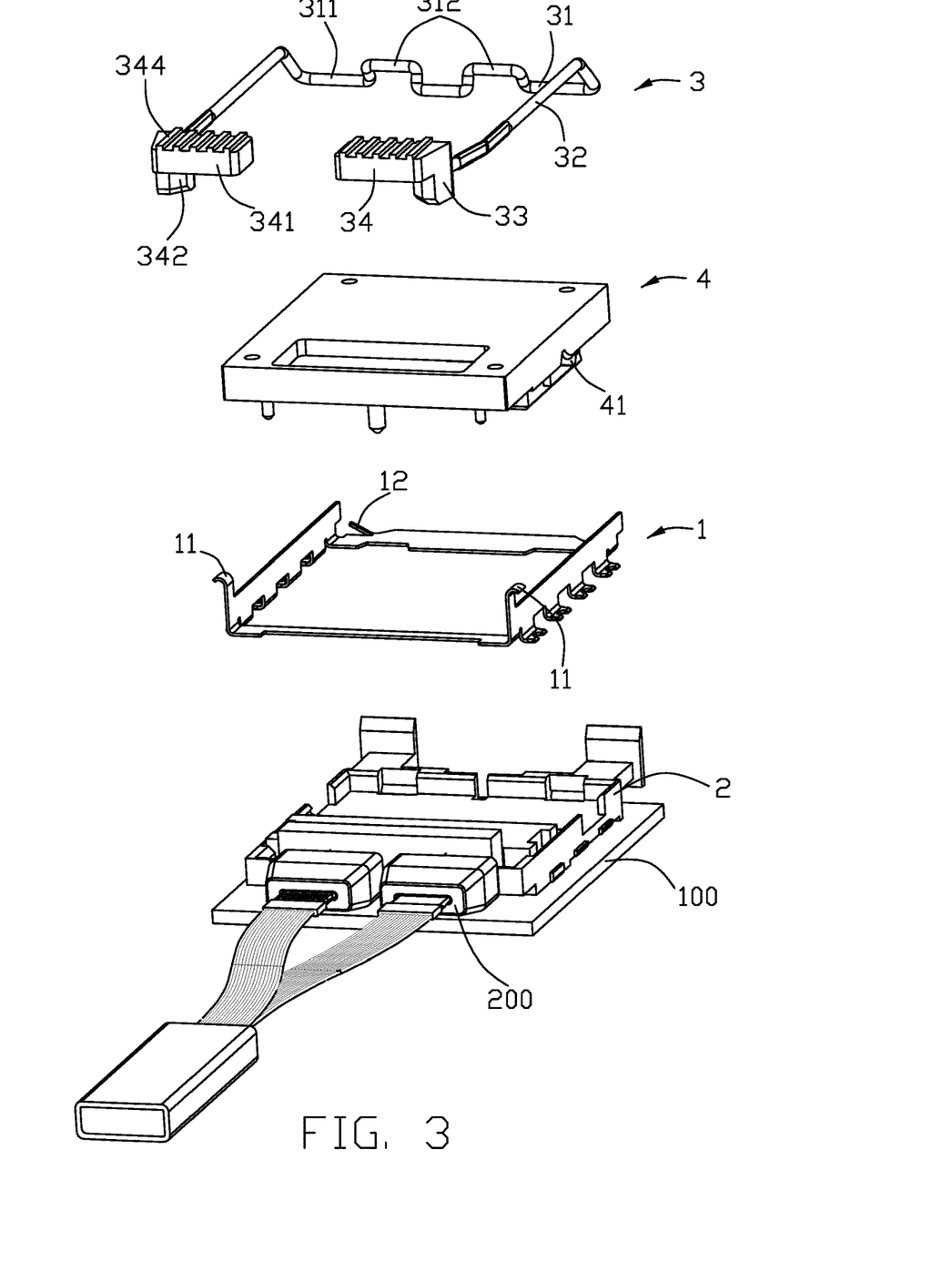
FIG. 3 is an exploded perspective view of the electrical connector assembly of FIG. 1.
Figure 4:
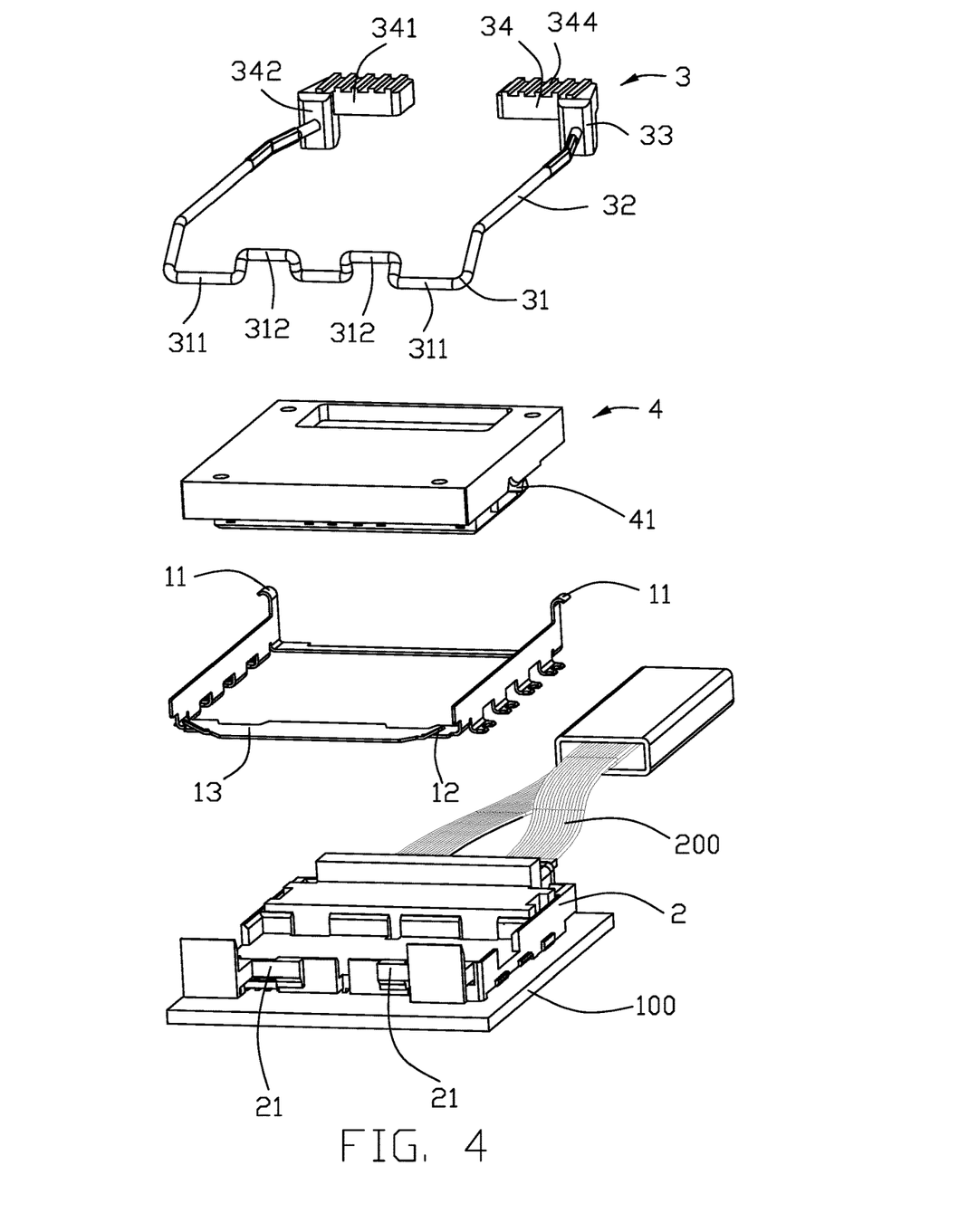
FIG. 4 is another exploded perspective view of the electrical connector assembly of FIG. 1.
Figure 5:
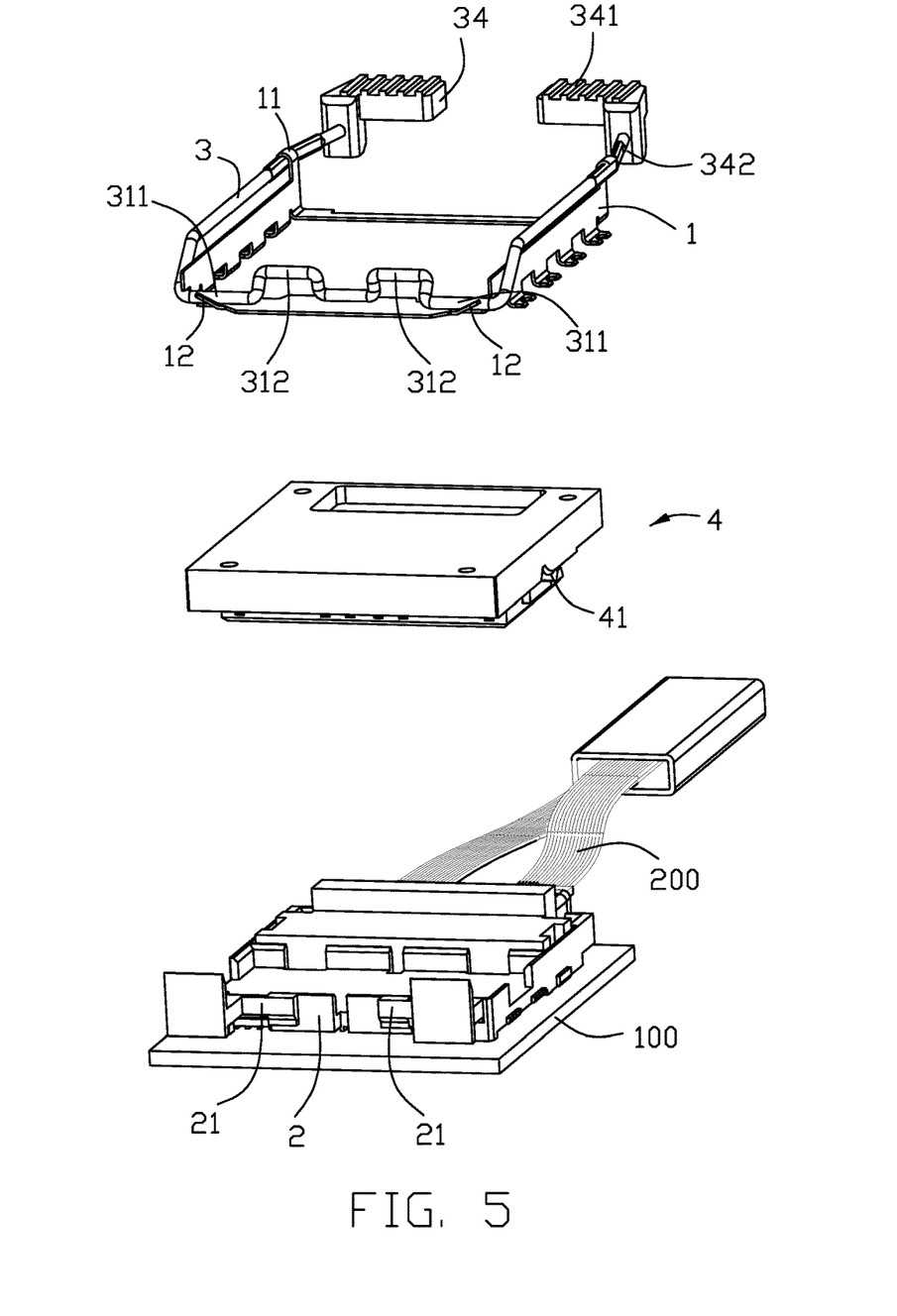
FIG. 5 is a partially assembled perspective view of the electrical connector assembly of FIG. 4.
Figure 6:
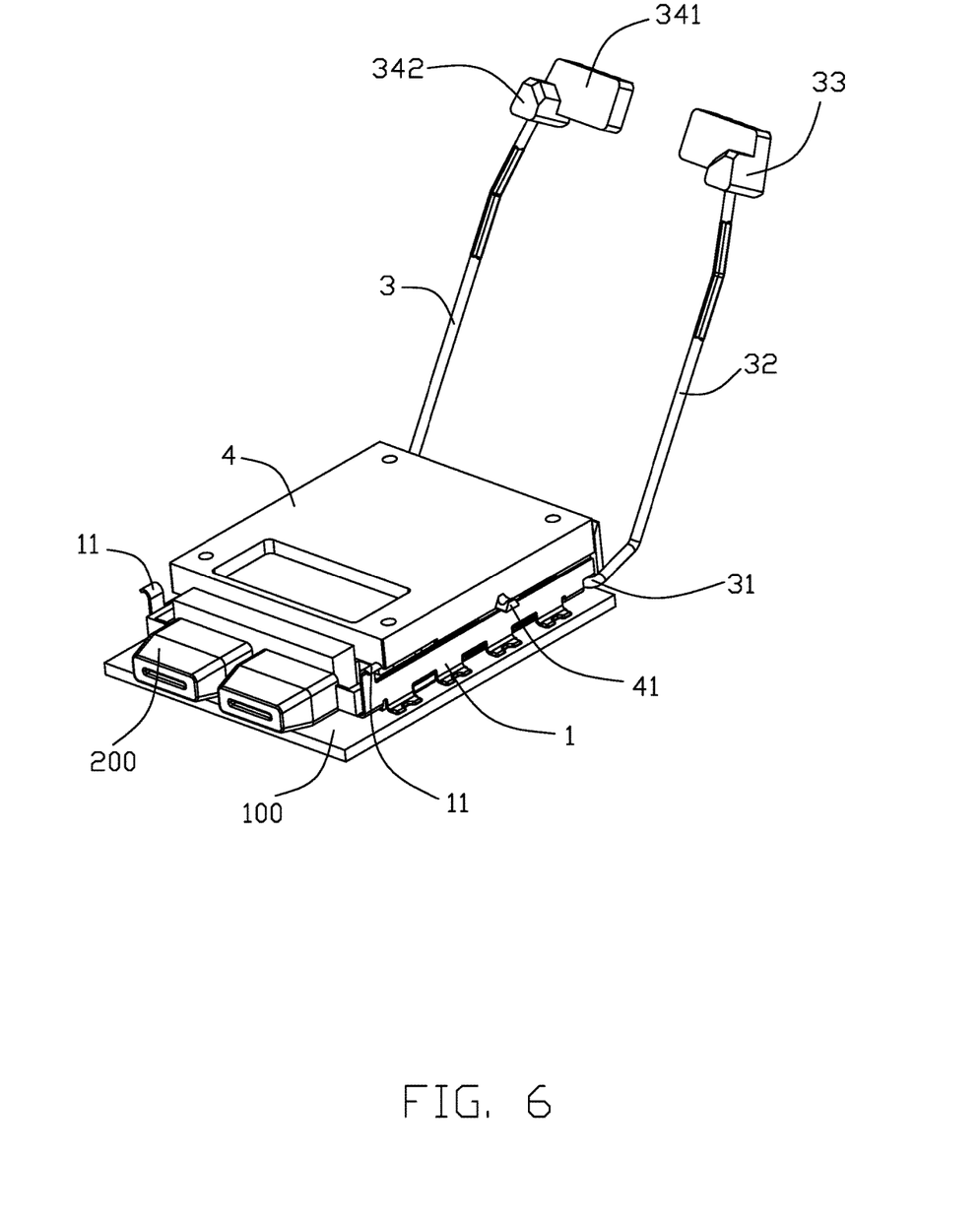
FIG. 6 is a further assembled perspective view of the electrical connector assembly of FIG. 5.
Figure 7:
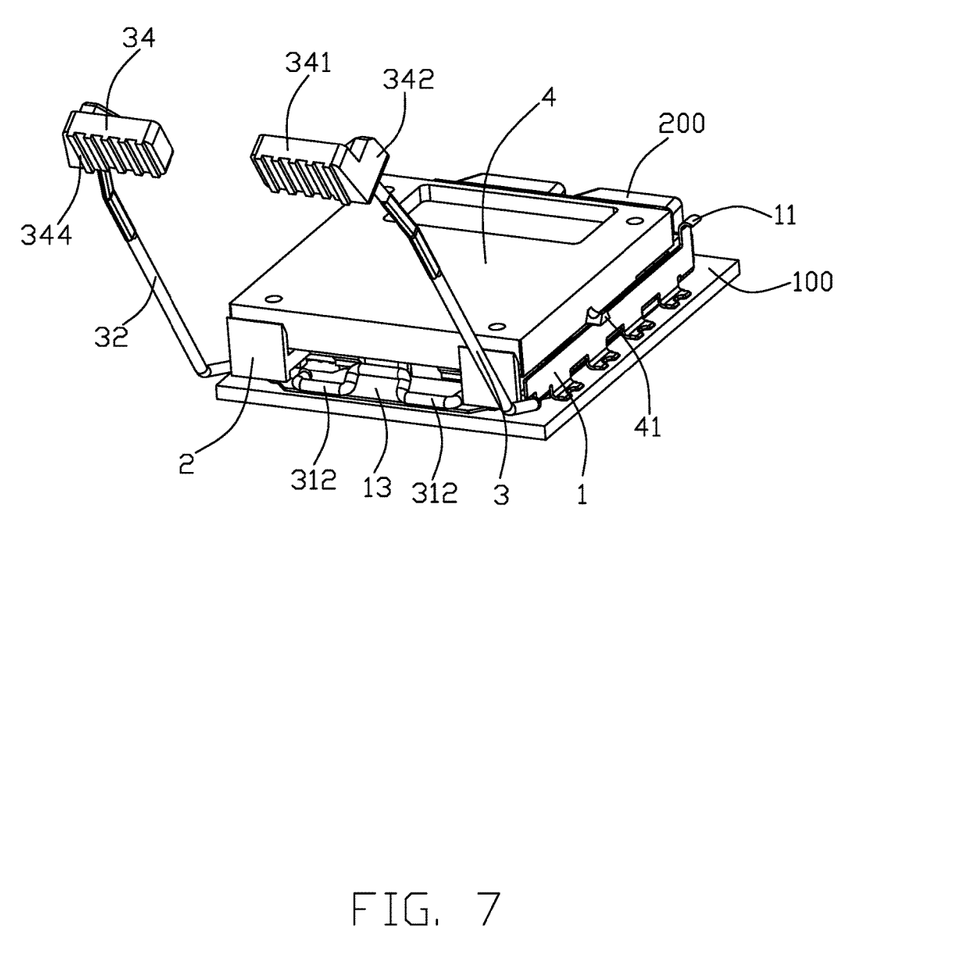
FIG. 7 is another perspective view of the electrical connector assembly of FIG. 6.
Figure 8:
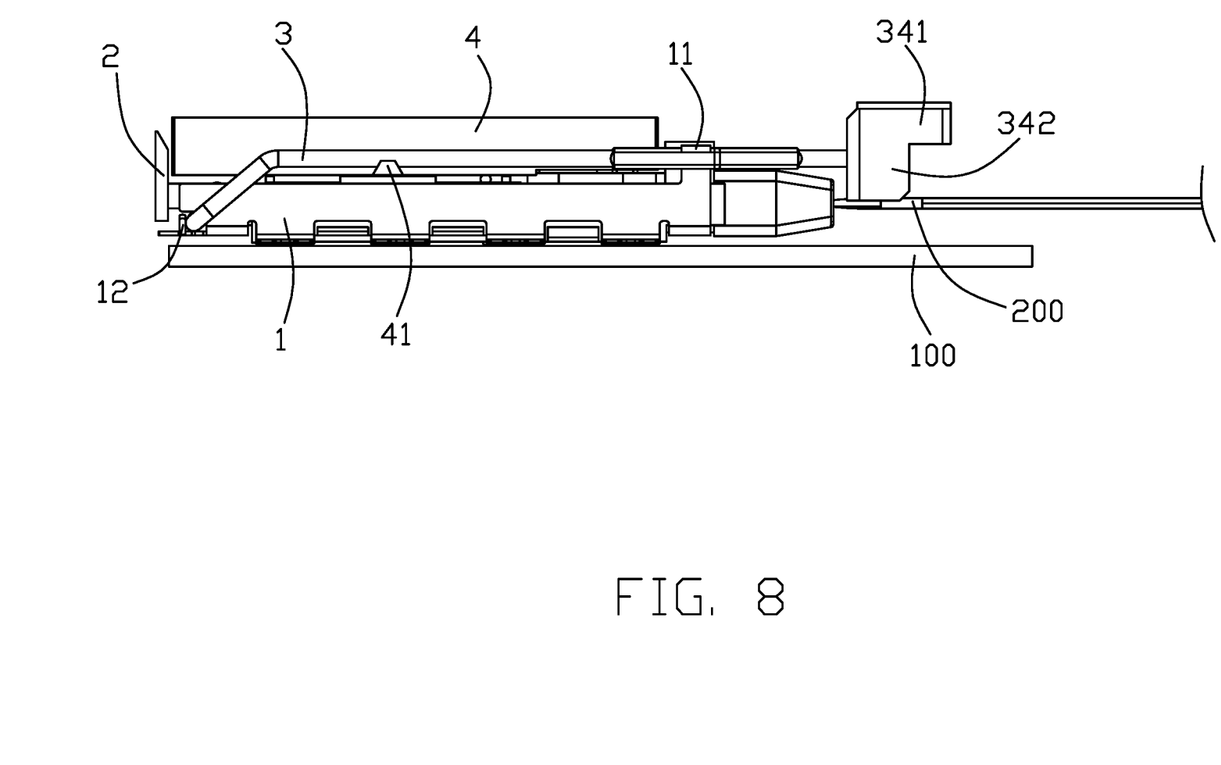
FIG. 8 is a side view of the electrical connector assembly of FIG. 1 to show the retention lever is locked in position.
Figure 9:
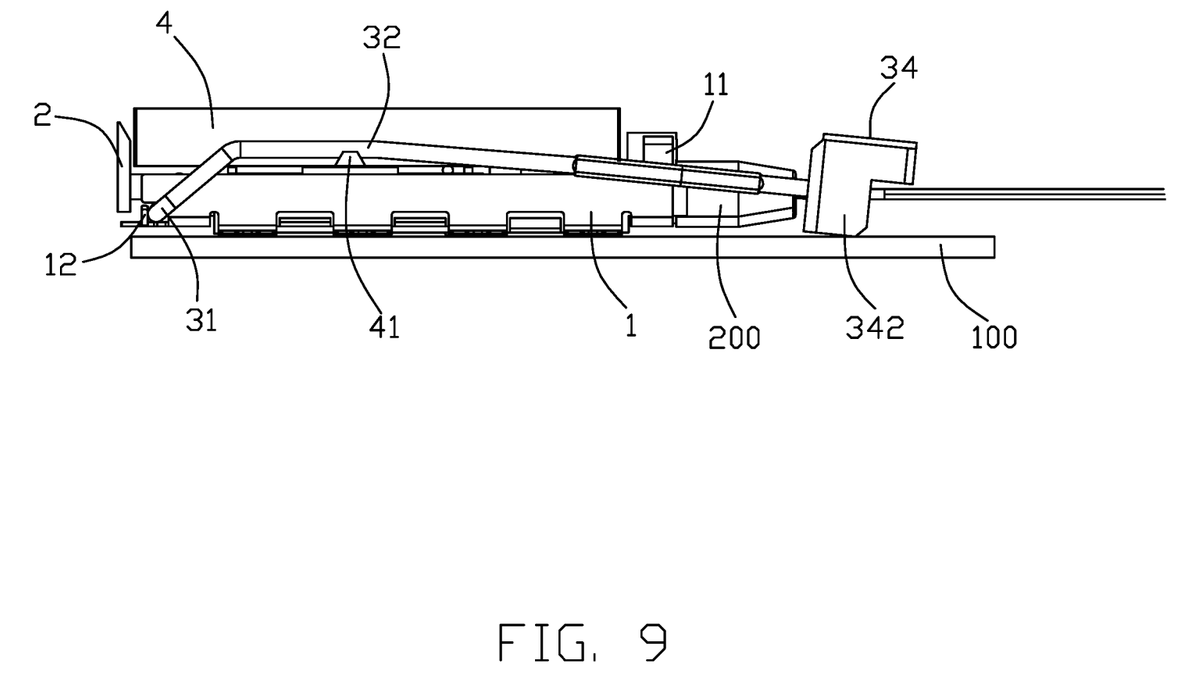
FIG. 9 is another side view of the electrical connector assembly of FIG. 1 to show the retention lever is downwardly deflected excessively.
Figure 10:
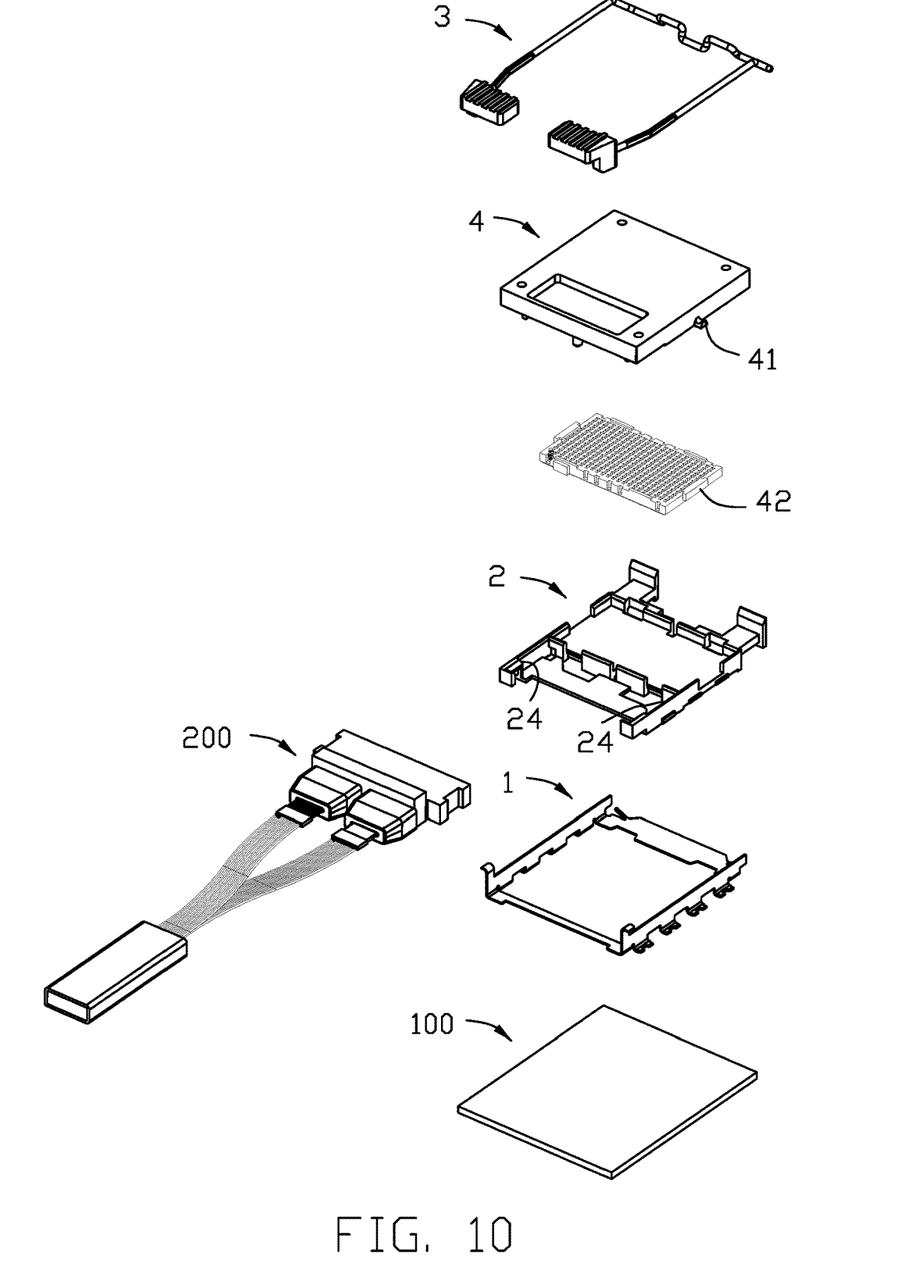
FIG. 10 is a further exploded perspective view of the electrical connector assembly of FIG. 3.

During operation, for the retention lever 3 from the closed position (FIGS. 1, 2 and 8) to an open position (FIGS. 6, 7 and 9) the handling section 33 with the corresponding abutment block 34 is downwardly moved by the finger so as to have the pressing section 32 is downwardly deflected and disengaged from the hook 11 and further outwardly/laterally slightly deflected and successively upwardly moved with rotation more than ninety degrees until the resisting part 312 abuts against the printed circuit board as shown in FIG. 7. In this period, the ear 41 is no longer pressed downwardly by the pressing section 32 so as to allow the optoelectronic module 4 to be removed from the housing 2. After the optoelectronic module 4 is removed from the housing, the optical jumper module 200 which is originally downwardly loaded into and restrictively received within the front portion of the housing 2, is also allowed to be upwardly released from the housing 2, as what is understandably shown in the corresponding figures of the aforementioned U.S. Pat. No. 9,730,351. Notably, the step structure 24 at the front end of the housing 2 restricts the optical jumper module 200 from forwardly moving after the optical jumper module 200 is downwardly loaded into the front portion of the housing 2. The optical jumper 200 is also downwardly pressed by the optoelectronic module 4 after assembled. In other words, the optoelectronic module 4 should be upwardly removed from the housing 2 before the optical jumper module 200 is upwardly removed from the housing 2.

It is noted that the housing 2 further includes a rear wall 21 to allow the resisting part 312 to abut thereagainst when no optoelectronic module 4 is received within the housing 2 and no ear 41 is available for the pressing section 32 to press against. It is also noted that the detailed structure of the housing 2 including the complementary connector therein is not shown, which the connector 42 of the optoelectronic module 4 is mated with.

The spirit of the invention is to provide the downward protrusion 342 of the abutment block 34, which is adapted to abut against the printed circuit board 100 when the retention lever 3 is about to be excessively deflected and the handling section 33 is about to be excessively moved, so as to prevent excessively forces from being applied upon the optoelectronic module 4 due to engagement between the pressing section 32 and the ear 41, thus removing a risk of damaging the optoelectronic module 4. In addition, the downward protrusion 342 leaves the sufficient space thereabouts not to interfere with the optical jumper module 200 so as to remove a risk of damaging the optical jumper module 200.

While a preferred embodiment in accordance with the present disclosure has been shown and described, equivalent modifications and changes known to persons skilled in the art according to the spirit of the present disclosure are considered within the scope of the present disclosure as described in the appended claims. For example, the pivotal section of the retention lever may be mounted to the housing rather than the frame, and the hook for keeping the retention lever in the closed position may be formed upon the housing rather than frame, the step structure for restricting forward movement of the optical jumper module may be formed on the frame rather than the housing.

What is claimed is:

1. An electrical connector assembly comprising:
   a printed circuit board;
   a frame mounted upon the printed circuit board;
   a retention lever pivotally mounted upon the frame and moveable between a closed and open positions with regard to an upwardly exposed housing;
   the housing disposed upon the printed circuit board and within the frame;
   an optoelectronic module downwardly loaded into and received in the housing and forming an upwardly exposed ear adapted to be downwardly pressed by the retention lever so that the optoelectronic module is irremovable away from the housing without removal of the retention lever therefrom first; and
   an optical jumper module assembled in a front portion of the housing and optically coupled with the optoelectronic module; wherein
   the retention lever further includes a downwardly protruding stopper adapted to abut against the printed circuit board when the retention lever is about to be excessively downward deflected.

2. The electrical connector assembly as claimed in claim 1, wherein the retention lever includes a pivotal section pivotally mounted about a rear end of the frame.

3. The electrical connector assembly as claimed in claim 2, wherein the downwardly protruding stopper is located around a front end of the frame.

4. The electrical connector assembly as claimed in claim 2, wherein the retention lever includes a pressing section extending along a front-to-back direction during locking the optoelectronic module, and a handing section located at a front end of the pressing section, and the downwardly protruding stopper is formed upon the handling section.

5. The electrical connector assembly as claimed in claim 4, wherein said pressing section is downwardly pressed by a hook of the frame to downward press the ear.

6. The electrical connector assembly as claimed in claim 4, wherein the retention lever includes two pressing sections and two handling sections on two sides of the frame, and said two handling sections are spaced from each other with a distance therebetween in a transverse direction perpendicular to said front-to-back direction.

7. The electrical connector assembly as claimed in claim 4, wherein the pivotal section includes a fixing part extending along a pivotal axis, and a resisting part laterally offset from the fixing part for abutting against the printed circuit board when the retention lever is located in the open position, and abutting against a wall of the housing when the retention lever is located in the closed position without any optoelectronic module in the housing.

8. The electrical connector assembly as claimed in claim 4, wherein said downwardly protruding stopper is formed on an abutment block which is mounted upon the handling section and spaced from the optical jumper module in either the front-to-back direction or a vertical direction perpendicular to said front-to-back direction.

9. The electrical connector assembly as claimed in claim 4, wherein the housing forms a step structure around a front end thereof to restrict the optical jumper module from forward moving.

10. The electrical connector assembly as claimed in claim 4, wherein the retention lever includes two pressing sections and two handling sections on two sides of the frame, and said two handling sections are spaced from each other with a distance therebetween in a transverse direction perpendicular to said front-to-back direction.

11. An electrical connector assembly adapted to be mounted upon a printed circuit board, comprising:
    a metallic frame;
    a metallic retention lever moveable between opposite open and closed positions and along a front-to-back direction having a rear pivotal section pivotally mounted around a rear end of the frame, a middle pressing section and a front handling section for operating the retention lever;
    an upwardly exposed insulative housing;
    an optoelectronic module downwardly loaded into and disposed in the housing and downwardly pressed by the pressing section; and an optical jumper module located in a front portion of the housing and optically coupled to the optoelectronic module; wherein the handling section is equipped with an abutment block with a downwardly protruding stopper thereon so as to prevent excessive downward deflection of the retention lever.

12. The electrical connector assembly as claimed in claim 11, wherein said frame includes a hook to retain the retention lever in the closed position.

13. The electrical connector assembly as claimed in claim 11, wherein the housing includes a step structure around a front end to restrict forward movement of the optical jumper module.

14. The electrical connector assembly as claimed in 10, wherein the optoelectronic module includes an ear against which the pressing section downwardly abuts.

15. The electrical connector assembly as claimed in claim 11, wherein the pivotal section includes a fixing part extending along a pivotal axis, and a resisting part laterally offset from the fixing part for abutting against the printed circuit board when the retention lever is located in the open position, and abutting against a wall of the housing when the retention lever is located in the closed position without any optoelectronic module in the housing.

16. An electrical connector assembly adapted to be mounted upon a printed circuit board, comprising:
 a metallic frame;
 an upwardly exposed insulative housing disposed in the frame;
 a metallic retention lever moveable between opposite open and closed positions and along a front-to-back direction having a pivotal section mounted upon one of the frame and the housing, a middle pressing section and a front handling section for operating the retention lever;
 an optoelectronic module downwardly loaded into and disposed in the housing and downwardly pressed by the pressing section; and
 an optical jumper module located in a front portion of the housing and optically coupled to the optoelectronic module; wherein
 the handling section is equipped with an abutment block with a downwardly protruding stopper thereon so as to prevent excessive downward deflection of the retention lever.

17. The electrical connector assembly as claimed in claim 16, wherein a step structure is formed on one of the housing and the frame to prevent forward movement of the optical jumper module.

18. The electrical connector assembly as claimed in claim 16, wherein a hook is formed on one of the housing and the frame to maintain the retention lever in the closed position.

19. The electrical connector assembly as claimed in claim 16, wherein the pivotal section includes a fixing part extending along a pivotal axis, and a resisting part laterally offset from the fixing part for abutting against the printed circuit board when the retention lever is located in the open position, and abutting against a wall of the housing when the retention lever is located in the closed position without any optoelectronic module in the housing.

20. The electrical connector assembly as claimed in claim 16, wherein said optoelectronic module includes an ear which the pressing section downwardly abuts against.

\* \* \* \* \*